(12) United States Patent
Benninger

(10) Patent No.: US 8,761,733 B2
(45) Date of Patent: *Jun. 24, 2014

(54) SYSTEM AND METHOD FOR CONTROLLING MOBILE DEVICE PROFILE TONES

(71) Applicant: Blackberry Limited, Waterloo (CA)

(72) Inventor: Bradley Dennis Benninger, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,733

(22) Filed: Aug. 26, 2013

(65) Prior Publication Data

US 2013/0344848 A1 Dec. 26, 2013

Related U.S. Application Data

(63) Continuation of application No. 13/558,531, filed on Jul. 26, 2012, now Pat. No. 8,548,437, which is a continuation of application No. 12/573,264, filed on Oct. 5, 2009, now Pat. No. 8,244,219.

(51) Int. Cl.
*H04M 1/725* (2006.01)

(52) U.S. Cl.
USPC ............... 455/412.2; 455/456.4; 455/567; 379/207.16

(58) Field of Classification Search
USPC ........ 455/412.2, 456.4, 566, 567; 379/207.16
See application file for complete search history.

(56) References Cited

U.S. PATENT DOCUMENTS

| | | | |
|---|---|---|---|
| 6,426,736 B1 | 7/2002 | Ishihara | |
| 7,136,482 B2 | 11/2006 | Wille | |
| 7,239,896 B1 | 7/2007 | Hill et al. | |
| 7,408,887 B2 | 8/2008 | Sengupta et al. | |
| 8,244,219 B2 * | 8/2012 | Benninger | 455/412.2 |
| 8,548,437 B2 * | 10/2013 | Benninger | 455/412.2 |
| 2004/0066932 A1 | 4/2004 | Seligmann | |
| 2004/0203695 A1 | 10/2004 | Mikan | |
| 2004/0205775 A1 | 10/2004 | Heikes et al. | |
| 2006/0036688 A1 | 2/2006 | McMahan et al. | |
| 2008/0081674 A1 | 4/2008 | Orr | |
| 2008/0165022 A1 | 7/2008 | Herz et al. | |
| 2009/0153490 A1 | 6/2009 | Nymark et al. | |

FOREIGN PATENT DOCUMENTS

| | | |
|---|---|---|
| EP | 1841189 A1 | 10/2007 |
| WO | WO 2004/079310 A2 | 9/2004 |

OTHER PUBLICATIONS

Schmid, Andreas; Search Report from corresponding European Application No. 09172184.5; search completed Feb. 26, 2010.

* cited by examiner

*Primary Examiner* — Raymond Dean

(74) *Attorney, Agent, or Firm* — Brett J. Slaney; Blake, Cassels & Graydon LLP

(57) ABSTRACT

A system and method are provided that utilize a set of heuristics to more intelligently determine when to utilize an audible tone associated with a notification profile or other mechanism used to alert a user of events such as an incoming instant message. The heuristics employed consider the layering of the message screens for the corresponding conversations, in combination with one or more device usage indicators such as the status of the backlight, the idle timer, and the orientation of the mobile device 10A itself as indicated by the orientation sensor.

12 Claims, 9 Drawing Sheets

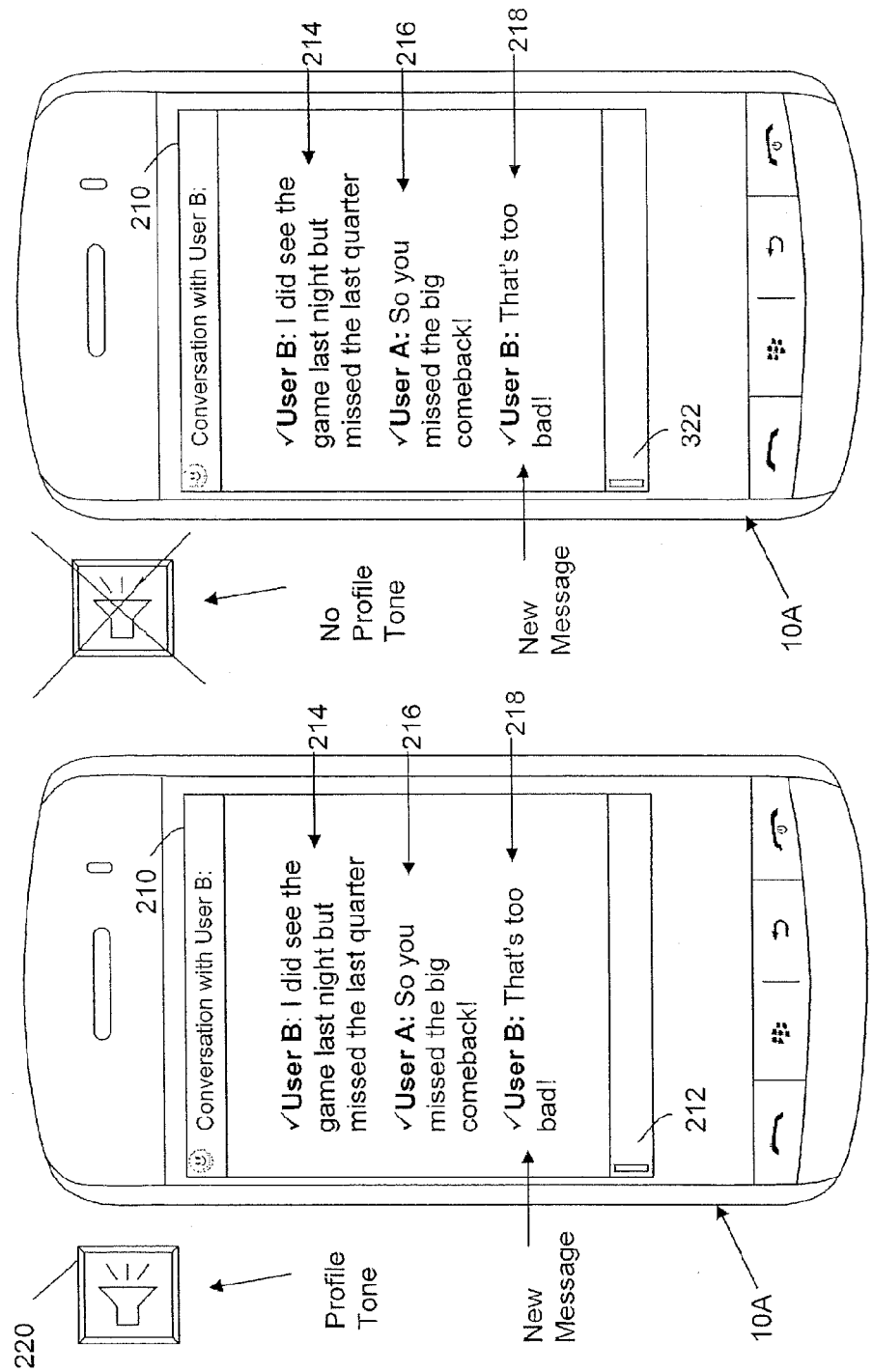

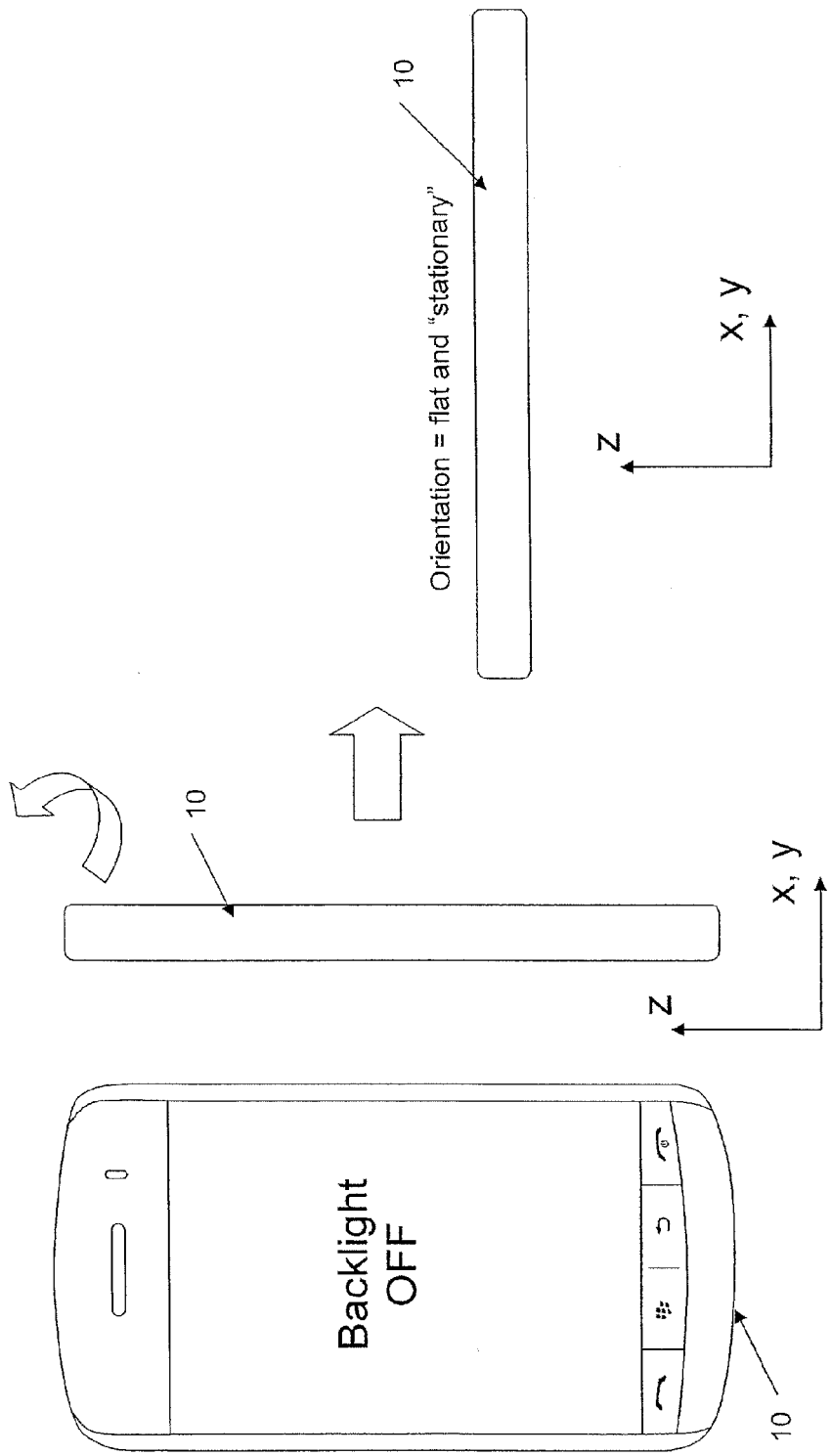

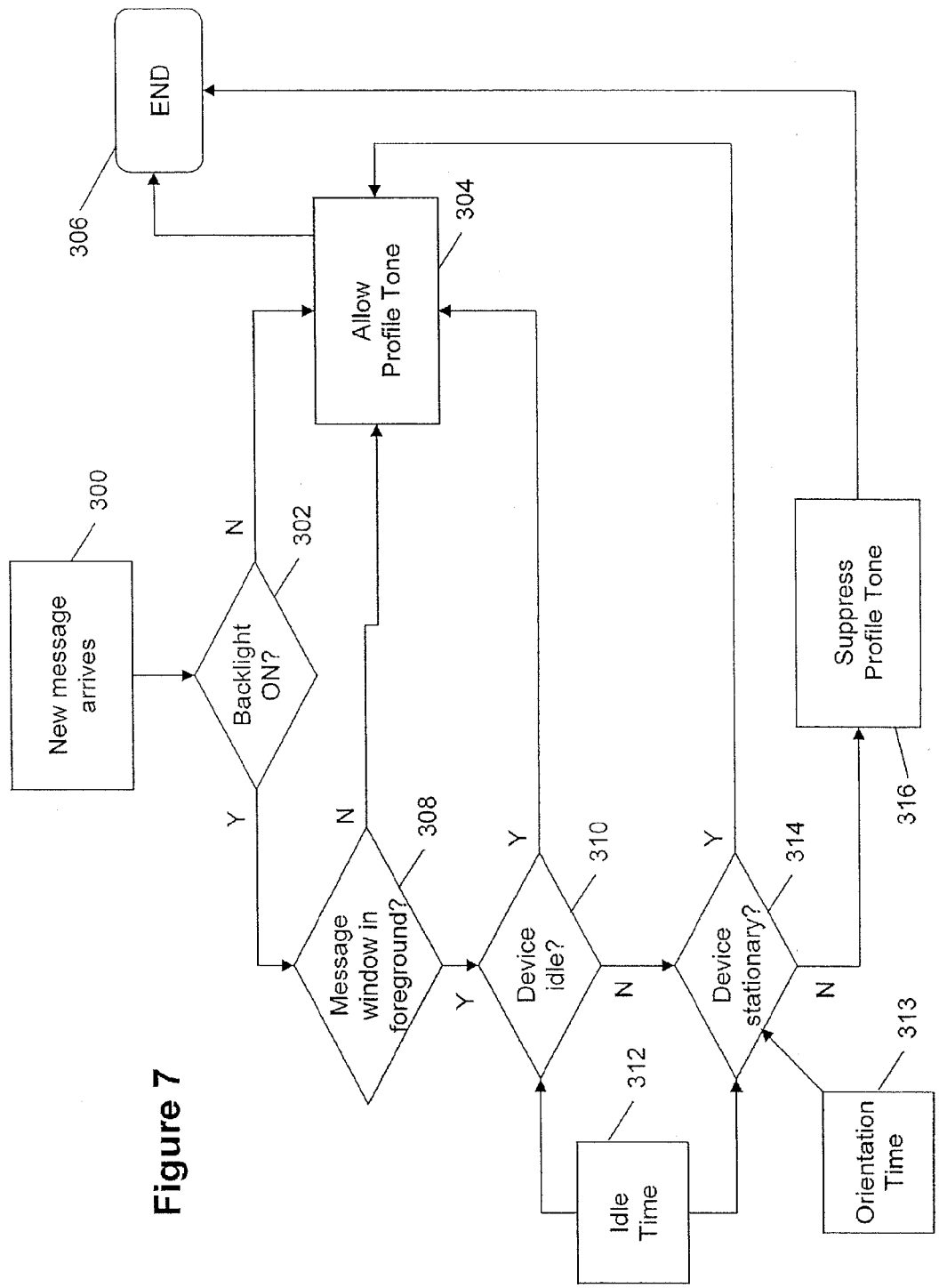

SYSTEM AND METHOD FOR CONTROLLING MOBILE DEVICE PROFILE TONES

CROSS-REFERENCE TO RELATED APPLICATIONS

This application is a continuation of U.S. patent application Ser. No. 13/558,531 filed on Jul. 26, 2012 which is a continuation of U.S. patent application Ser. No. 12/573,264 filed Oct. 5, 2009, the contents of which are incorporated herein by reference.

TECHNICAL FIELD

The following relates to systems and methods for controlling mobile device profile tones.

BACKGROUND

Instant messaging has become a popular way of electronically communicating in a conversational style, in particular using a mobile or handheld device. Whether instant messaging on a desktop computer or a mobile device, notification profiles are often used to notify the user of events such as the receipt of a new incoming message. For example, when a new instant message is received, an audible tone may be sounded either alone or in combination with a message balloon indicating from where the new instant message originated.

When instant messaging with multiple contacts or "buddies", such notification profiles can be relied upon to detect a new message in an inactive or "background" conversation while engaging in a current/active or "foreground" conversation. This enables the user to determine an appropriate time to switch between messaging conversations. On mobile devices, where typically only one messaging window can be seen on the display screen at a time, the reliance on notification profiles can be even greater. However, in some cases, the notification profiles, in particular ones comprising an audible tone, can become distracting to the user and/or disruptive to others, especially when they are being notified of an event that they are currently witnessing.

BRIEF DESCRIPTION OF THE DRAWINGS

Embodiments will now be described by way of example only with reference to the appended drawings wherein:

FIG. 5E is a pictorial diagram of a mobile device displaying the screen shot illustrated in FIG. 5B upon being updated to show a new message received from User B while sounding an audible tone.

FIG. 5F is a pictorial diagram of a mobile device displaying the screen shot illustrated in FIG. 5B upon being updated to show a new message received from User B while suppressing the audible tone shown in FIG. 5E.

FIG. 6A is a pictorial diagram of a mobile device showing a blank or locked out screen with a backlight being off.

FIG. 6B is a side elevation view of the mobile device of FIG. 6A shown with respect to a set of axes to illustrate the mobile device in an upright orientation.

FIG. 6C is a side elevation view of the mobile device of FIG. 6B shown in a "flat" orientation with respect to the same axes.

FIG. 7 is a flow chart illustrating exemplary computer executable instructions for controlling use of an audible tone upon receiving a new instant message.

DETAILED DESCRIPTION OF THE DRAWINGS

In instant messaging applications utilizing notification profiles, it has been realized that audible tones that are sounded according to such profiles may not be required in all scenarios and therefore can be suppressed according to predetermined heuristics in these scenarios. Conversely, it has also been realized that there are other scenarios wherein an audible tone should be sounded when the application of such heuristics would otherwise suppress the tone.

In the following, a method and system are provided that utilize a set of heuristics to more intelligently determine when to utilize an audible tone associated with a notification profile or other mechanism used to alert a user of events such as an incoming instant message. It will be appreciated that although the following examples are provided in the context of instant messaging, the principles discussed herein are equally applicable to other conversational-type message exchange services, e.g. SMS, MMS, etc.

The following examples include communications between mobile or handheld devices, which will be commonly referred to as mobile devices hereinafter and referred to by numeral 10.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

Figure 1:
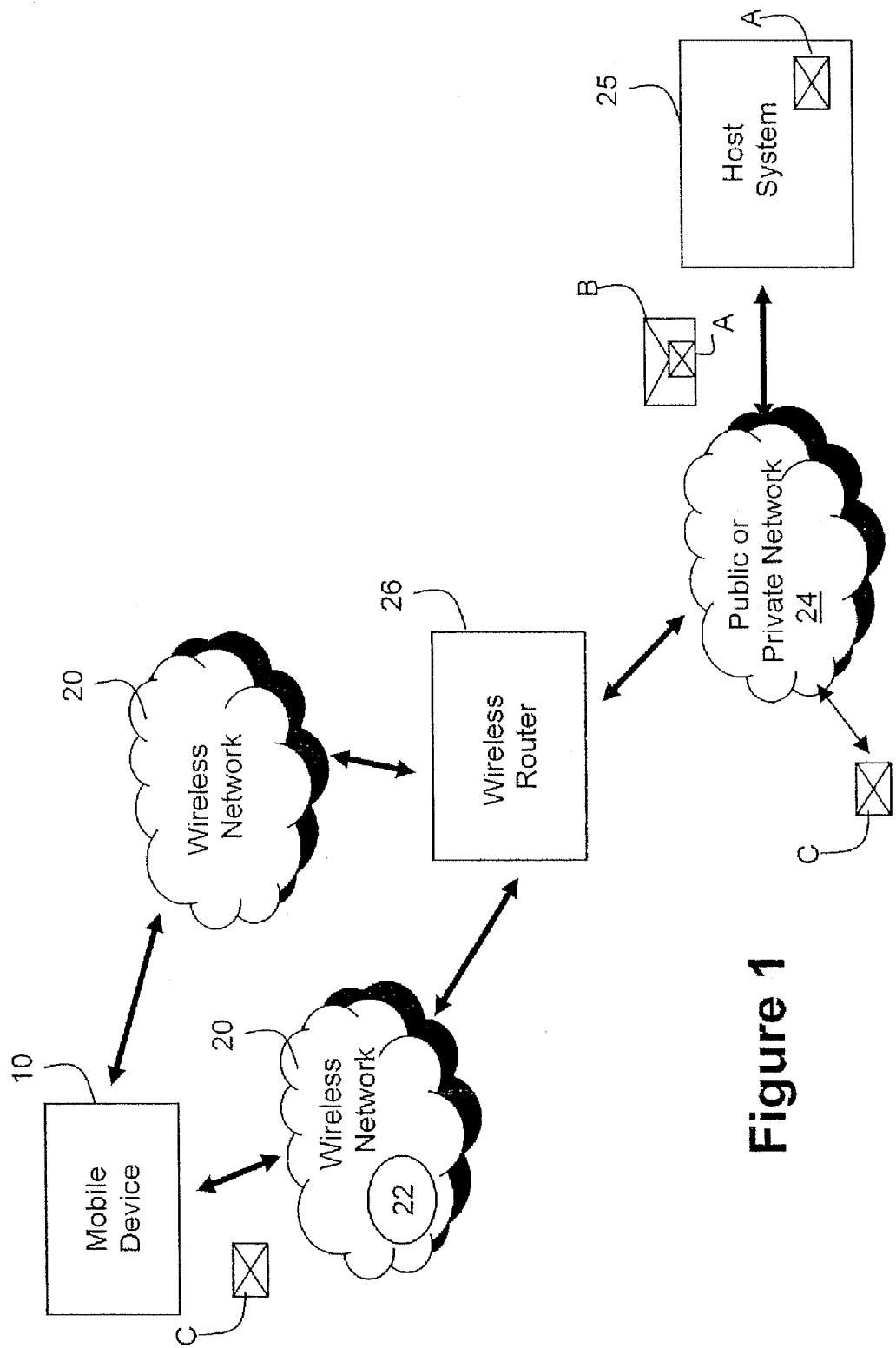
FIG. 1 is a schematic diagram illustrating a system in which data items are pushed from a host system to a mobile device.

FIG. 1 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system.

In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 2:
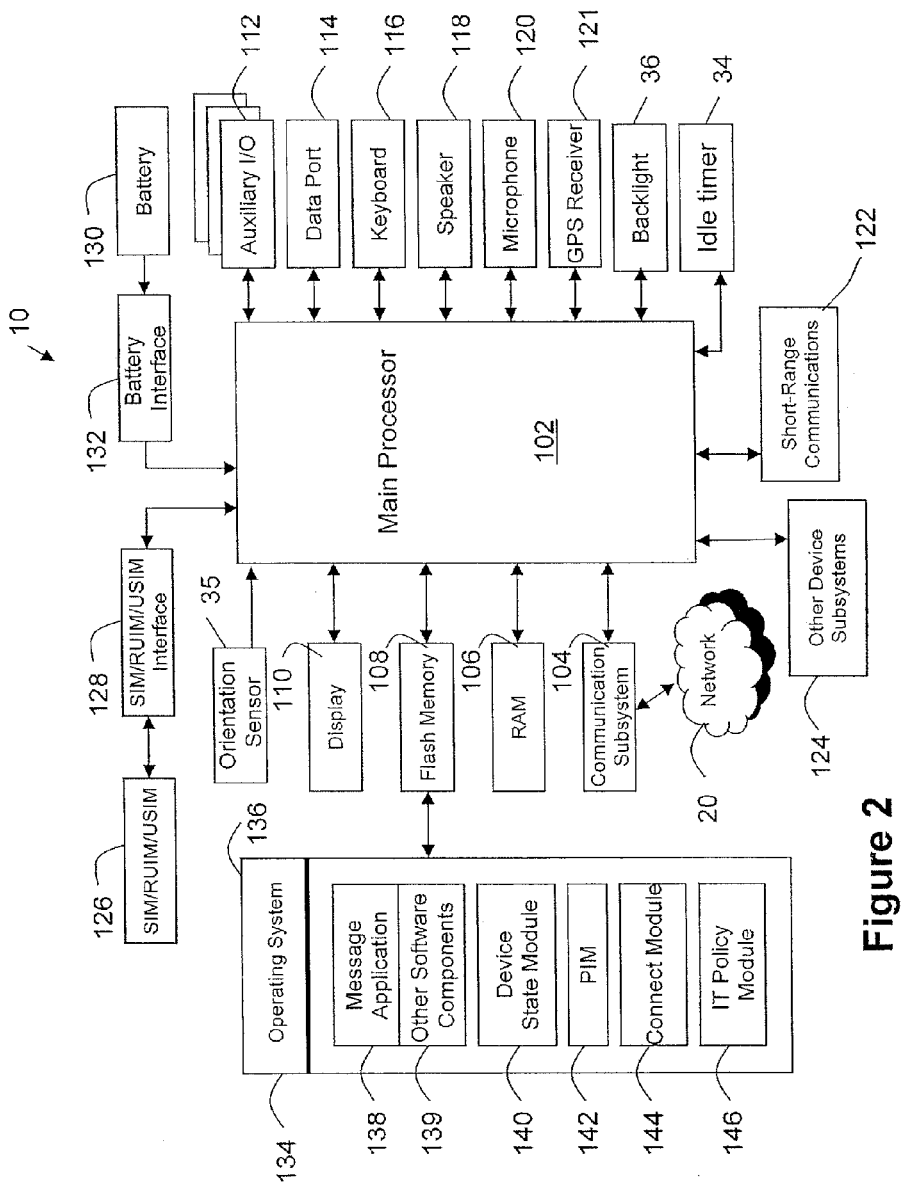
FIG. 2 is a block diagram of an exemplary embodiment of a mobile device.
Figure 3:
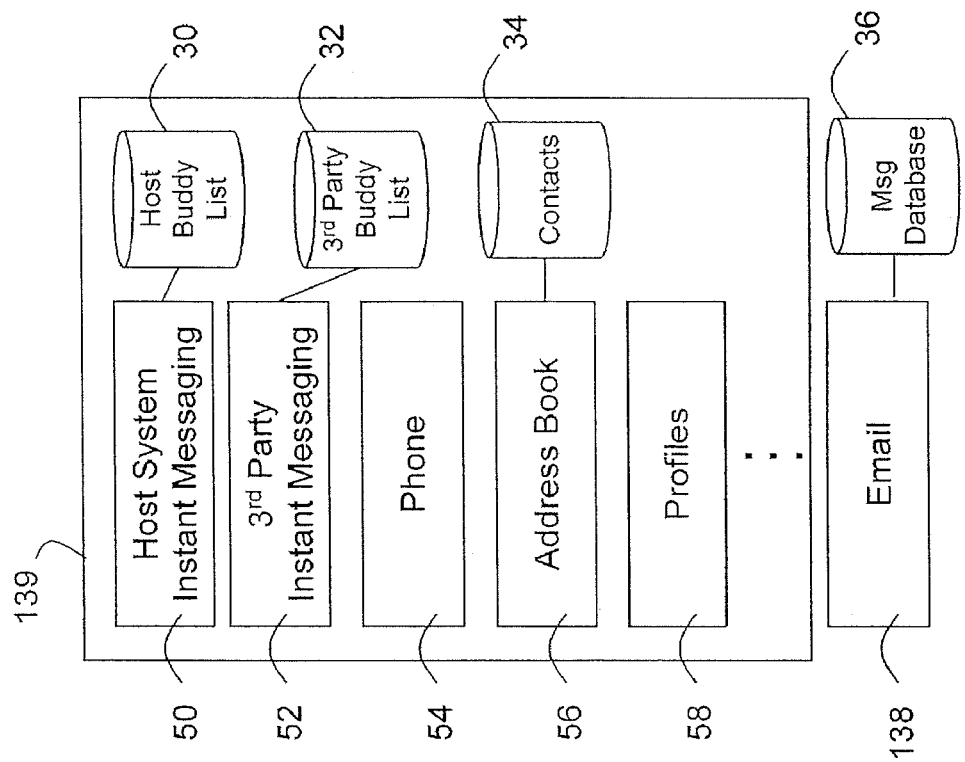
FIG. 3 is a block diagram illustrating exemplary ones of the other software applications and components shown in FIG. 2.

An exemplary configuration for the mobile device 10 is illustrated in FIGS. 2-3. Referring first to FIG. 2, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this exemplary embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network.

Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by an orientation sensor 35. The orientation sensor 35 may comprise an inclinometer or other sensor capable of determining the orientation of the mobile device 10 with respect to a datum.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. Only examples are shown in FIG. 3 and such examples are not to be considered exhaustive. In this example, a host instant message application 50, $3^{rd}$ party instant messaging application 52, phone application 54, address book 56 and a profiles application 58 are shown to illustrate the various features that may be provided by the mobile device 10. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The host system instant messaging application 50 is an instant messaging service that is hosted and provided by the host system 25 in this example, e.g. using a messaging server at the wireless router 26 as exemplified in FIG. 4 and discussed below. The host system instant messaging application 50 includes or otherwise has access to a host buddy list 30 for storing contact information for buddies also using the host system instant messaging application 50. The $3^{rd}$ part instant messaging application 52 includes or otherwise has access to a $3^{rd}$ party buddy list 32 for storing contact information for buddies also using the $3^{rd}$ party instant messaging application 52. It will be appreciated that any number of host system or $3^{rd}$ party instant messaging services can be installed and run on the mobile device 10 and thus the two shown in FIG. 3 are for illustrative purposes only. Also, it will be appreciated that in other embodiments, only a single instant messaging service may be supported or a unified instant messaging service that combines contact or buddy lists for multiple instant messaging services and utilizes a common user interface (not shown).

Figure 4:
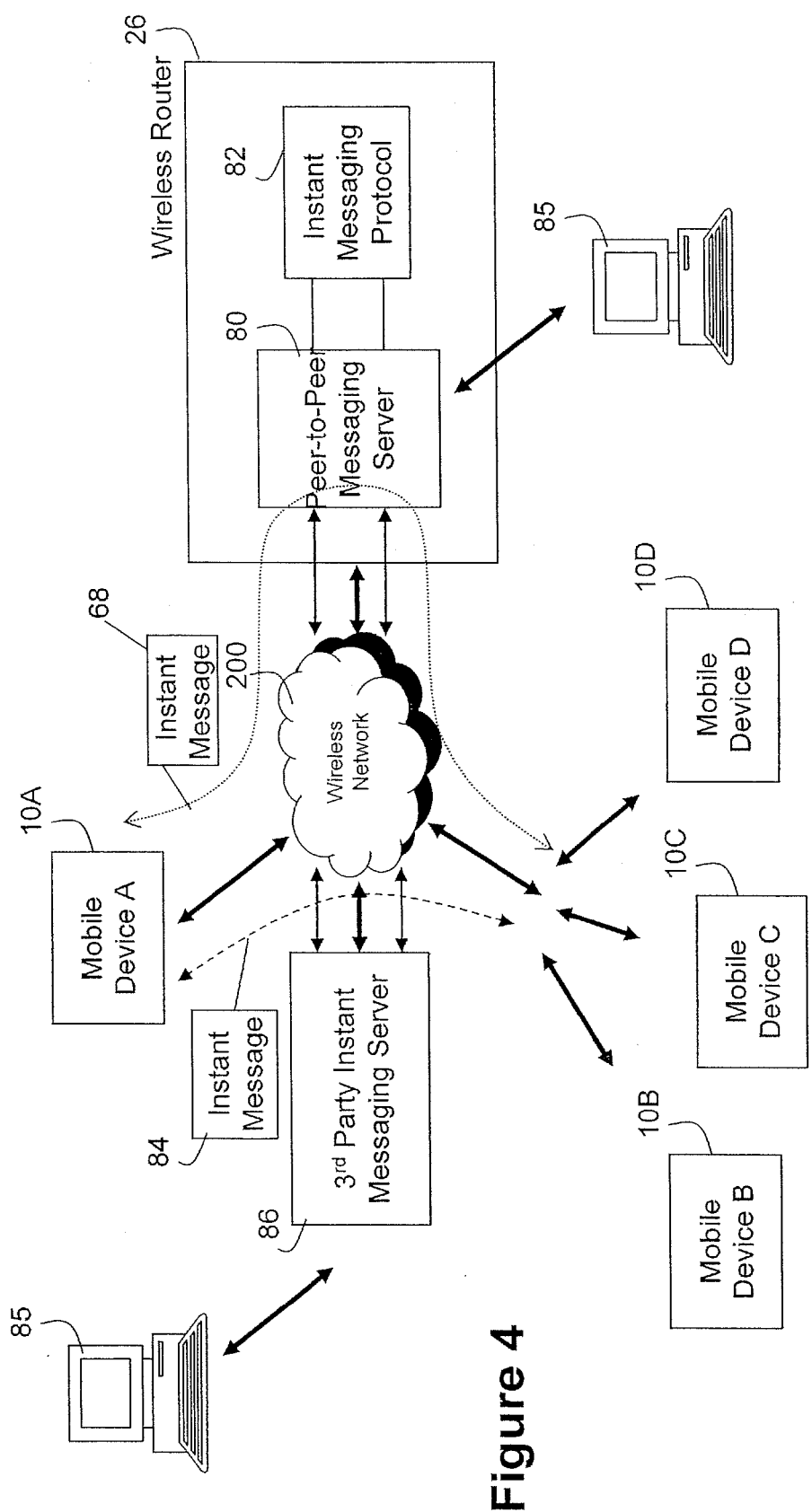
FIG. 4 is a system diagram showing one configuration for instant messaging on multiple platforms.

FIG. 4 illustrates a configuration suitable for a user of mobile device A, hereafter referred to as mobile device 10A, to conduct instant messaging with buddies included in their IM buddy lists 30, 32. It can be seen in FIG. 4 that the two examples of instant messaging systems from FIG. 3 are shown. The host system IM service is shown that utilizes the wireless router 26 and a $3^{rd}$ party instant messaging service is also shown that utilizes a $3^{rd}$ party instant messaging server 86 accessed by mobile device 10A through the network 20. The host system IM service can be implemented in any suitable manner but for the sake of illustration, the following describes the host system IM service as being a personal identification number (PIN)-based messaging system. As can be seen, the 3rd party instant messaging server 86 may also communicate with desktop users 85 thus facilitating instant messaging between desktop users 85 and between a mobile device user 10 and a desktop user 85. Similarly, the PIN-based messaging system may also facilitate communications with desktop users 85.

In the embodiment illustrated in FIG. 4, the PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 1. In FIG. 4, the wireless router 26 facilitates communications such as instant messaging between mobile device 10A and mobile devices for User B, User C and User D, denoted by 10B, 10C and 10D respectively. It will be appreciated that the number of users participating in the example shown in FIG. 4 is for illustrative purposes only. Instant messaging is provided by the instant messaging applications 50, 52 stored on each mobile device 10A-10D which can be initiated, for example, by highlighting and selecting a corresponding instant messaging icon from a display for the mobile device 10. In the host system IM service, the wireless router 26 routes messages between the mobile devices 10A-10D according to a PIN-to-PIN protocol 82.

A PIN-to-PIN based instant message is generally denoted by numeral 68 in FIG. 4 and may differ in structure from a $3^{rd}$ party based instant message 84. In a PIN-based messaging protocol 82, each message 68 has associated therewith a PIN corresponding to the mobile device 10 which has sent the message 68 (source) and includes a destination PIN identifying the intended recipient (destination). Although not shown in FIG. 4, each message 68 generally comprises a body, which contains the content for the message 68 (e.g. text), and a header, which contains various fields used for transmitting and processing each message 68. In this example, the header includes a message type field to specify the type of transmission (e.g. PIN, SMS etc.), a source field to specify the device address for the sender, a destination field to specify the device address for the intended recipient, a conversation ID field to identify which conversation thread the message 68 corresponds to (e.g. such that each message 68 is identified by the conversation in which it was sent), and a timestamp field to indicate the time (and if desired, the date) at which the message 68 was sent by the designated sender.

Although not shown in FIG. 4, one or more tags can also be used to indicate to the host system IM application 50, upon receipt of a message 68, that the message 68 has certain attributes such as a subject that is to be displayed, whether additional information is being transported (i.e. data or information in addition to the message content), or whether the message 68 is being used for some other purpose such as provisioning, synchronization, etc. In general, in a PIN based messaging protocol 82, the sender of the message 68 knows the PIN of the intended recipient. This is preferably established when the two devices request to add each other to their respective contact or buddy lists. At the time of requesting new contacts, in traditional PIN-to-PIN protocols 82, the two respective PIN numbers may be exchanged via request e-mails which are configured to be intercepted by the respective host system instant messaging applications 50 so as to not appear in the message list or "inbox" of the user.

It can be seen in the example shown in FIG. 4 that mobile device 10A can communicate directly with any of the mobile devices 10B-10D through the peer-to-peer messaging server 80 as indicated by the short-dashed line. Instant messaging can also be accomplished through the 3rd party IM server 86 by sending 3rd party based instant messages 84 over the wireless network 20 as indicated by the long-dashed line.

When conducting a PIN-to-PIN instant messaging session according to the embodiment shown in FIG. 4, the mobile devices 10A-10D can communicate directly with the wireless router 26 in a client based exchange where, similar to other peer-to-peer programs, an intermediate server is not required. A message 68 sent by one mobile device 10 is received by the wireless router 26, which obtains the PIN number for the intended recipient from information associated with the message (e.g. a data log) or from the message itself. Upon obtaining the recipient's PIN according to the PIN-to-PIN protocol 82, the wireless router 26 then routes the message 68 to the recipient associated with the mobile device 10 having such PIN. The wireless router 26 typically also provides a delivery confirmation to the original sender, which may or may not be displayed to the user. The destination device can also provide such delivery information. The wireless router 26 should be capable of routing messages 68 reliably and hold onto the messages 68 until they are successfully delivered. Alternatively, if delivery cannot be made after a certain timeout period, the wireless router 26 may provide a response indicating a failed delivery. The wireless router 26 may choose to expire a message 68 if a certain waiting period lapses.

It will also be appreciated that, as noted above, instant messaging can be implemented using any other suitable protocol such as SMS. In SMS, a message is transmitted to an SMC center (SMSC) within a carrier's infrastructure, and then delivered to the mobile phone number of the destination device. The SMSC would also be configured to hold onto messages and deliver then once the destination device is within coverage.

When conducting an instant messaging session using a 3rd party IM application, access to the 3rd party IM server 86 is first established and instant messages 84 exchanged over the wireless network 20 according to the appropriate protocol used by the 3rd party. It will be appreciated that the principles discussed below are equally applicable to both PIN-to-PIN messaging and other Internet service-based instant messaging systems hosted by such 3rd parties.

Figures 5A, 5B:
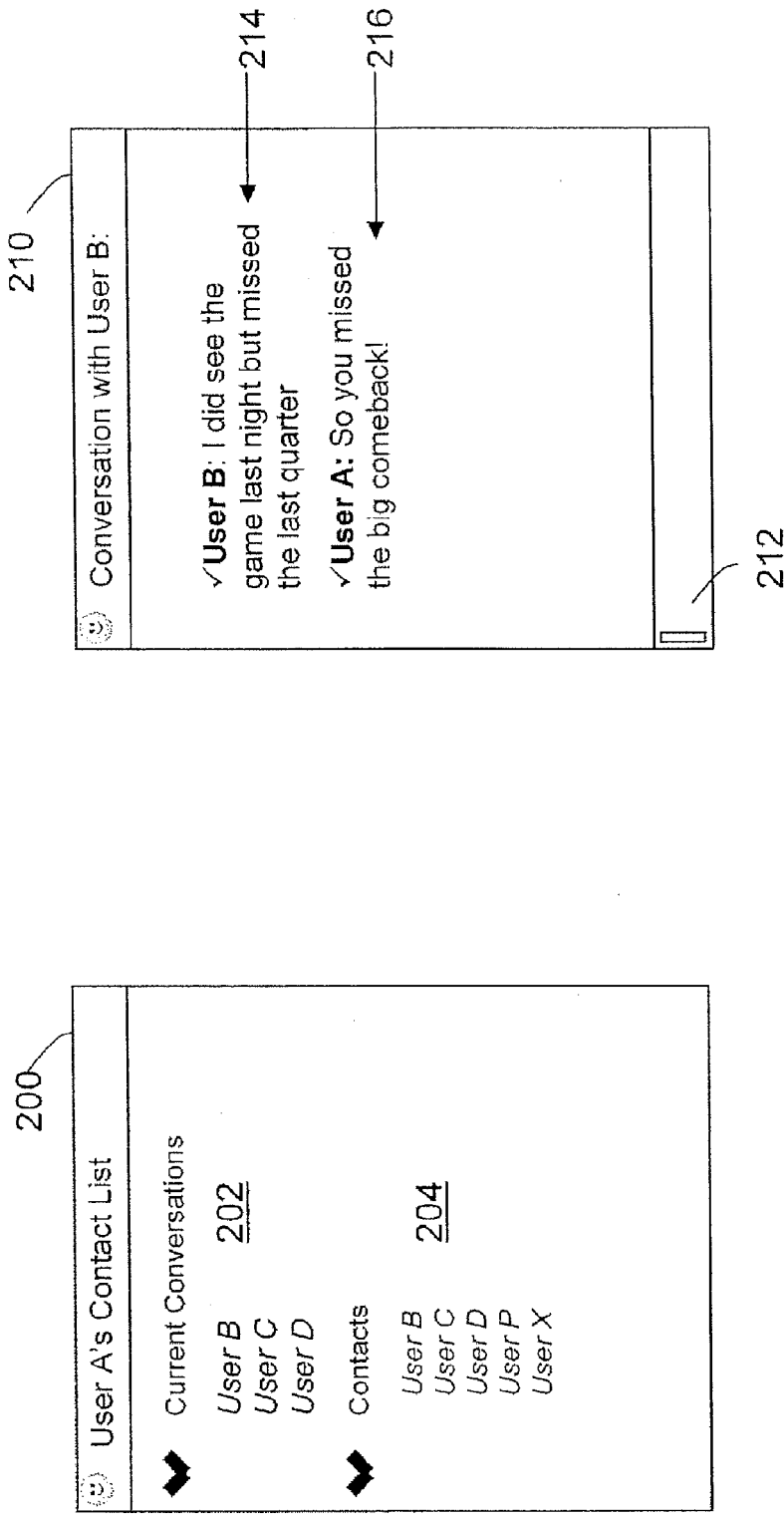
FIG. 5A is an exemplary screen shot of an instant messaging contact list for User A.
FIG. 5B is an exemplary screen shot of an instant messaging conversation between User A and User B as seen by User A.

Turning now to FIG. 5A, a contact list screen 200 for User A is shown which displays a first list comprising current conversations 202 and second list comprising the user's contacts 204. The contact list screen 200 is initiated by the mobile device 10A upon detecting selection of an appropriate icon (e.g. on a home screen—not shown) or through another suitable input. In this example, an instant messaging conversation with User B is initiated by selecting User B from either the current conversation list 202 or the contacts list 204 thus displaying a conversation screen 210 as shown in FIG. 5B. As can be seen in FIG. 5B, the conversation screen 210 includes a message entry portion 212 for entering text, emoticons, etc. to be sent as an instant message to the specified recipient (in this example User B). In FIG. 5B, a conversation with User B is shown wherein a first message 214 received from User B is listed, followed by a second message 216 sent by User A.

Figure 5D:
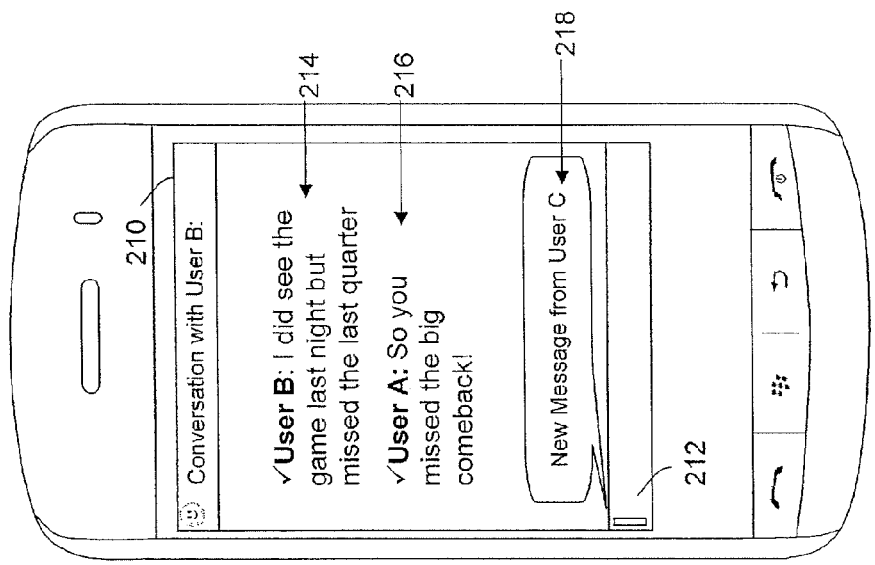
FIG. 5D is a pictorial diagram of a mobile device displaying the screen shot illustrated in FIG. 5B modified to alert User A of a new incoming message from User C.
Figure 5C:
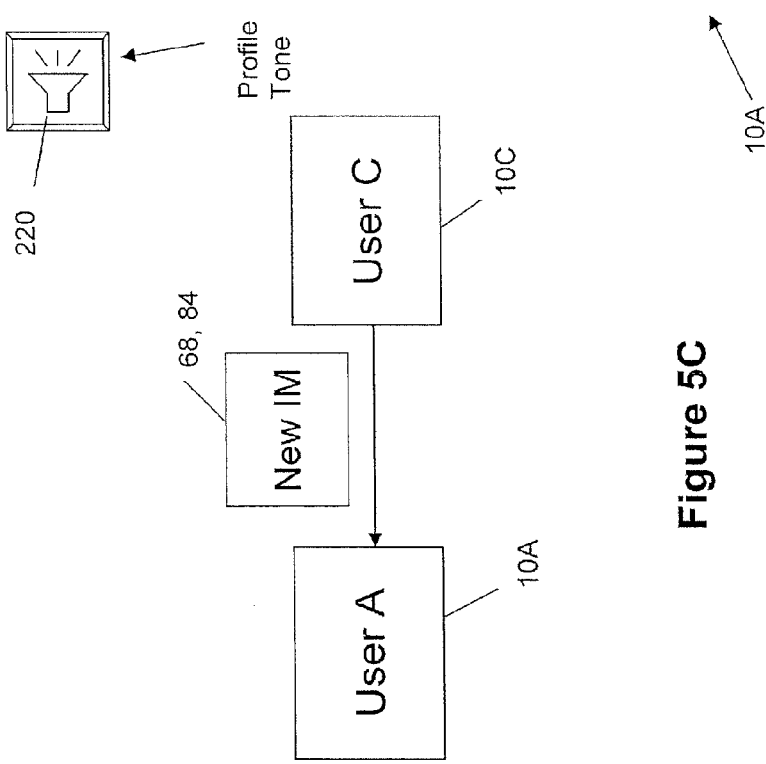
FIG. 5C is a block diagram illustrating a new incoming instant messaging sent by User C and received by User A.

FIGS. 5C and 5D illustrate an exemplary scenario wherein User A is notified of a new incoming message from User C while actively communicating with User B. In this example, mobile device 10A (which is associated with User A) is configured to utilize one or more notification profiles for incoming data. Notification profiles are well known in the art and thus some detail will be omitted for brevity. For mobile device 10A, various notification profiles can be selected to apply various notification options. For example, a "Quiet" profile may suppress all audible alerts such as a beeping tone. In another example, a "Loud" profile may increase the volume of an audible tone and cause the device to vibrate upon receiving a new email message, phone call, instant message, etc. Receipt of a new instant message 68, 84 can therefore qualify as an event that triggers an alert or notification according to a selected notification profile. In the example to be described below, a "Normal" notification profile setting may comprise a pop-up or other visual message to advise the user of a new message and indicate from where the message originates, combined with an audible tone that is sounded by the mobile device 10A at the same time. In this way, the user is notified visually and audibly of the new message.

As shown in FIG. 5C, a new instant message 68, 84 is provided by User C and received by User A. FIG. 5D illustrates a pictorial view of mobile device 10A showing the conversation screen 210 from FIG. 5B when receiving the new message 68, 84 from User C. In this example, when the message 68, 84 from User C arrives, a pop-up message 218 is displayed overlying the conversation screen 210 and is configured to resemble a speech balloon. At the same time, a profile tone 220 (i.e. a tone associated with a selected notification profile) is sounded by the mobile device 10A (e.g. through speaker 118) to alert User A of the incoming message. Since the conversation with User C (see also current conversations list 202 in FIG. 5A) is not currently in the foreground and is thus inactive or in the background, it is appropriate for User A to be notified both visually and audibly of the new message from User C. This is because if User A is not currently looking at the conversation screen 210, they can associate the profile tone 220 with the event corresponding to the receipt of a new message 68, 84. However, in some cases, e.g. when User A is actively engaged and thus looking at the conversation screen 210, the profile tone 220 may be redundant and could be disruptive to User A. User A could change to another profile that does not include the audible tone 220 but this would require commitment to the new profile or repeated switching between profiles.

Turning now to FIG. 5E, another example is shown wherein upon receiving a reply message 218 from User B while the conversation screen 210 is active and thus in the foreground, the profile tone 220 is also sounded. Again, this may be considered redundant if User A is currently engaged in the conversation with User B. User A may wish to suppress the profile tone 220 in such circumstances without having to necessarily change to a new profile. This circumstance is shown in FIG. 5F, wherein since User A is currently conversing with User B in the foreground (i.e. the conversation screen 210 is the active conversation), the profile tone is suppressed or the current profile is otherwise modified so as to not include an audible alert. To accommodate these circumstances, it has been realized that a set of heuristics can be used to more intelligently control use of the profile tone 220, regardless of which notification profile is currently selected. In this way, if the heuristics indicate that the profile tone 220 is redundant, the profile tone 220 can be suppressed whereas if not, the notification profile can be left alone to operate as intended.

As will now be exemplified, the heuristics employed consider the layering of the message screens for the corresponding conversations, in combination with one or more device usage indicators such as the status of the backlight 36, the idle timer 34, and the orientation of the mobile device 10A itself as indicated by the orientation sensor 35. FIG. 6A illustrates a mobile device 10 with the backlight 34 off which corresponds to a darkened or de-illuminated display 110. In some embodiments, the user cannot see anything on the screen when the backlight 36 is off. Also, the backlight 36 may have a plurality of illumination levels, for example, black, dim, bright, etc. The backlight 36 may also be associated with the idle timer 34 such that if the idle timer 34 indicates a predetermined amount of idle time for the mobile device 10, the backlight 36 is turned off to conserve battery power. The backlight 36 may also be associated with locking mechanisms that can be employed to lock-out the screen, either according to the same threshold of idle time or a different one if desired. It can be appreciated that the idle time thresholds and backlight 36 settings can be user-defined, policy driven, or fixed depending on the application or available options.

FIG. 6B illustrates a reference set of axes to illustrate the mobile device 10A in the upright or vertical position with respect to a horizontal or "flat" orientation as shown in FIG. 6C. The relative positioning or orientation of the mobile device 10A can be measured by the orientation sensor 35. The value indicated by the orientation sensor 35 can be tracked against an internal timer (not shown) to determine how long the mobile device 10A has been in a particular orientation (i.e. by generating an orientation time 313—see FIG. 7). For example, the flat orientation shown in FIG. 6C, when "stationary", can correspond to the mobile device 10A sitting idle on a desktop or other surface. In another example (not shown), the orientation may be inclined with respect to what is shown in FIG. 6C but still considered "stationary" since the angle of inclination has not changed for a certain period of time. This would capture the situation wherein the mobile device 10A has been set down on a non-planar surface such as a car seat or pillow, or propped up in a stand or charger. In this way, the absolute orientation can be tracked over a predetermined period of time to establish a stationary orientation, which can be "flat" as shown in FIG. 6C or at some other inclination. The establishment of orientation can then be used to more intelligently determine whether or not the user is likely to be looking at and thus be currently engaged in the messaging conversation. In circumstances wherein the user has just recently sent a message and then places the mobile device 10 down, even if the corresponding conversation for a new message is in the foreground, the user should be notified audibly because the likelihood that they are not actively looking at the conversation screen 210 is higher.

The above observations, when combined, can be used to establish an intelligent set of heuristics that can be employed by the main processor 102 (or other equivalent processing device in the mobile device 10) to determine whether or not to suppress an audible alert, e.g. the profile tone 220 illustrated herein. Turning now to FIG. 7, an example set of heuristics is shown that considers one or more device status indicators in combination with the layering of the corresponding conversation screen to intelligently determine whether or not to allow a profile tone 220 to be sounded (if applicable—e.g. by allowing the notification profile to operate as intended by doing nothing) or to suppress any applicable profile tone 220 by actively modifying the notification profile settings, at least temporarily, if necessary.

At 300, the mobile device 10A determines that a new message 68, 84 has arrived. The appropriate instant messaging application 50, 52 can be used to monitor incoming messages 68, 84 or a separate routine can be implemented and controlled by the main processor 102 or other processing module. Upon detecting receipt of a new message at the mobile device 10A, the process determines if the new message corresponds to a conversation that is currently being displayed on the mobile device 10A. In this example, the backlight status is checked at 302 to determine if the backlight 36 is off. This check can inherently indicate inactivity regardless of which conversation screen 210 is in the foreground and can also indicate that the mobile device 10A is locked or placed in a holster (not shown). Since the lack of illumination on the display 110 is indicative of the inability to observe even the active or foreground conversation screen 110, the profile tone 220 is allowed to be used at 304 and the routine shown in FIG. 7 ends at 306.

If the backlight 36 is on, there is the ability to observe the conversation screen 210 and thus a series of other determinations should be made. At 308, the mobile device 10A determines whether or not the incoming message corresponds to the conversation that is in the foreground or the top or visible layer, which can also indicate whether or not a new message corresponds to a conversation currently being displayed. If not, i.e. if the corresponding conversation is in the background or otherwise inactive, the profile tone 220 is allowed at 304 since the user is unable to actively view the new message and the audible tone would be indicative of a new message. When combined with the visual message 218, the user is given the appropriate notification for the current situation. If however the corresponding conversation is in the foreground, there is again a greater likelihood that the user is actively engaged in the corresponding conversation, the conversation screen is currently being displayed, and thus the situation does not require the audible profile tone 220 to be sounded. If the conversation screen 210 is currently being displayed, the process may then determine whether or not the conversation screen 210 is "visible" by considering one or more device status indicators as discussed above. In this example, to determine if the conversation screen 210 is visible and thus the user is likely to observe receipt of the new message, the idle timer 34 can be referenced at 310 and the mobile device 10A can compare the current idle time 312 to a predetermined threshold. If the mobile device 10A has been idle (e.g. has not be interacted with through various applicable input devices) for more than a predetermined amount of time (i.e. the idle time measured meets the threshold), this can indicate that the mobile device 10A is not currently being used and thus the mobile device 10A allows the profile tone 220 to be sounded at 304 and the process ends at 306.

It has been observed that although the conversation window layering and the idle time 312 (and if applicable the backlight status) can in most cases accurately determine whether or not the conversation screen 210 and receipt of the new message is "visible" to the user and thus the profile tone 220 is not needed, there are other scenarios wherein simply suppressing the profile tone 316 at this point may be inappropriate. To accommodate these scenarios, the orientation of the mobile device 10A is then considered at 314. As discussed above, the mobile device 10A may be considered stationary if it can be assumed to be physically idle or without movement—in other words if the mobile device 10A has consistently maintained a particular orientation. If the mobile device 10A is considered stationary at 314, this may indicate that the user has put down the mobile device 10A and thus even if they recently sent or received a message or otherwise interacted with the mobile device 10A, they are not actively engaged in the conversation, and thus an audible profile tone 220 is appropriate and should be allowed at 304 and the process ends at 306.

To determine whether or not the mobile device 10A is stationary the process should consider the orientation of the mobile device 10A over a certain period of time. For example, if the orientation sensor 35 provides a horizontal reading in one instance, this could simply mean the user has tilted the mobile device 10A in their hands momentarily and the orientation reading over time still fluctuates. The amount of time that a mobile device 10A has held or maintained a consistent orientation (e.g. the orientation time 313) can then be compared to the idle time 312. If the mobile device 10A has been stationary for an amount of time that is similar to the amount of time the mobile device 10A has been idle, this would indicate that the user has set down the mobile device 10A since they last interacted with it, and thus should be notified by way of the profile tone 220 at 304 and the process ends at 306. If however the orientation of the mobile device 10 is fluctuating or is otherwise dissimilar to the idle time 312, this likely indicates that the user is currently engaged in the conversation and thus the profile tone 220 is not required. In this case, the profile tone 220 is suppressed at 316 and the process ends at 306.

The difference between the orientation time 313 and the idle time 312 sufficient to suppress the profile tone 220 can be determined empirically and should allow a reasonable buffer to compensate for the user's movements between actions. For example, when the user stops typing it will take up to a few seconds to put down the mobile device 10A and establish a consistent orientation and thus the buffer should accommodate this.

There are also scenarios wherein the orientation is consistent but the idle time is not, i.e. orientation time>idle time. For example, the user can set down the mobile device 10A on a surface and continue typing even though the mobile device 10A is physically "flat". In this case, the device would not be considered stationary in terms of the determination at 314 because the orientation time 313 would keep extending beyond the idle time 312 creating a continually increasing gap between the times and the profile tone 220 would be suppressed at 316. It may be noted that if the mobile device 10A remains stationary until the next new message 68, 84 arrives, if the idle time 312 passes the threshold in the meantime, the determination at 310 would then cause the profile tone 304 to be sounded for that next message 68, 84. Therefore, by tracking the user's activity with the mobile device 10A and the continuity/consistency of the orientation of the mobile device 10A, the mobile device 10A is able to more intelligently determine whether or not the user is likely to be viewing the conversation screen 210 and consequently whether or not the use of a profile tone 220 is appropriate.

Although the above has been described with reference to certain specific embodiments, various modifications thereof will be apparent to those skilled in the art without departing from the scope of the claims appended hereto.

The invention claimed is:

1. A method of controlling use of an audible profile tone for providing alerts on a mobile device indicative of receipt of new messages in a conversational message exchange, said method comprising:
   upon detecting receipt of a new message at said mobile device, determining if said conversation screen is in the foreground of said display;
   if said conversation screen is in the foreground of said display, determining whether or not said conversation screen is visible by considering one or more device status indicators comprising an idle time and an orientation time indicative of an amount of time said mobile device has maintained a particular orientation, determining whether or not said conversation is visible comprising:
      determining if said idle time meets a predetermined threshold; and
      if said predetermined threshold has not been met, determining if said orientation time is within a predetermined time window with respect to said idle time for said mobile device; and
   if said conversation screen is visible, suppressing said profile tone.

2. The method according to claim 1, further comprising determining if said new message corresponds to a conversation currently being displayed on said mobile device, by determining if a backlight for a display for said mobile device is on or off, wherein if said backlight is on, the method comprises determining if said conversation screen is in the foreground of said display.

3. The method according to claim 1, wherein if said orientation time is not within said predetermined time window, said conversation is visible.

4. The method according to claim 1, wherein said conversational message exchange corresponds to an instant messaging conversation.

5. A non-transitory computer readable medium comprising computer executable instructions for controlling use of an audible profile tone for providing alerts on a mobile device indicative of receipt of new messages in a conversational message exchange, said computer readable medium comprising instructions for:
   upon detecting receipt of a new message at said mobile device, determining if said conversation screen is in the foreground of said display;
   if said conversation screen is in the foreground of said display, determining whether or not said conversation screen is visible by considering one or more device status indicators comprising an idle time and an orientation time indicative of an amount of time said mobile device has maintained a particular orientation, determining whether or not said conversation is visible comprising:
      determining if said idle time meets a predetermined threshold; and
      if said predetermined threshold has not been met, determining if said orientation time is within a predetermined time window with respect to said idle time for said mobile device; and
   if said conversation screen is visible, suppressing said profile tone.

6. The non-transitory computer readable medium according to claim 5, further comprising instructions for determining if said new message corresponds to a conversation currently being displayed on said mobile device, by determining if a backlight for a display for said mobile device is on or off, wherein if said backlight is on, executing instructions for determining if said conversation screen is in the foreground of said display.

7. The non-transitory computer readable medium according to claim 5, wherein if said orientation time is not within said predetermined time window, said conversation is visible.

8. The non-transitory computer readable medium according to claim 5, wherein said conversational message exchange corresponds to an instant messaging conversation.

9. A mobile device comprising a display, a processor and a speaker, said mobile device configured for controlling use of an audible profile tone for providing alerts using said speaker indicative of receipt of new messages in a conversational message exchange, said mobile device being further configured for:

upon detecting receipt of a new message at said mobile device, determining if said conversation screen is in the foreground of said display;

if said conversation screen is in the foreground of said display, determining whether or not said conversation screen is visible by considering one or more device status indicators comprising an idle time and an orientation time indicative of an amount of time said mobile device has maintained a particular orientation, determining whether or not said conversation is visible comprising:

determining if said idle time meets a predetermined threshold; and if said predetermined threshold has not been met, determining if said orientation time is within a predetermined time window with respect to said idle time for said mobile device; and if said conversation screen is visible, suppressing said profile tone.

10. The mobile device according to claim 9, further configured for determining if said new message corresponds to a conversation currently being displayed on said mobile device, by determining if a backlight for a display for said mobile device is on or off, wherein if said backlight is on, the method comprises determining if said conversation screen is in the foreground of said display.

11. The mobile device according to claim 9, wherein if said orientation time is not within said predetermined time window, said conversation is visible.

12. The mobile device according to claim 9, wherein said conversational message exchange corresponds to an instant messaging conversation.

* * * * *